United States Patent [19]

Gonzalez-Martin et al.

[11] Patent Number: 5,779,912

[45] Date of Patent: Jul. 14, 1998

[54] PHOTOCATALYTIC OXIDATION OF ORGANICS USING A POROUS TITANIUM DIOXIDE MEMBRANE AND AN EFFICIENT OXIDANT

[75] Inventors: Anuncia Gonzalez-Martin, College Station; Oliver J. Murphy, Bryan; Dalibor Hodko, College Station, all of Tex.

[73] Assignee: Lynntech, Inc., College Station, Tex.

[21] Appl. No.: 791,599

[22] Filed: Jan. 31, 1997

[51] Int. Cl.[6] .................................................. C02F 1/32
[52] U.S. Cl. ...................... 210/748; 210/763; 422/186.3
[58] Field of Search .............................. 210/748, 763; 422/186.3

[56] References Cited

U.S. PATENT DOCUMENTS

| | | |
|---|---|---|
| 4,684,537 | 8/1987 | Graezel et al. . |
| 4,792,407 | 12/1988 | Zeff et al. . |
| 4,836,929 | 6/1989 | Baumann et al. . |
| 4,849,114 | 7/1989 | Zeff et al. . |
| 4,867,052 | 9/1989 | Cipelletti . |
| 4,892,712 | 1/1990 | Robertson et al. . |
| 4,997,576 | 3/1991 | Heller et al. . |
| 5,126,111 | 6/1992 | Al-Ekabi et al. ............ 210/748 |
| 5,137,607 | 8/1992 | Anderson et al. . |
| 5,256,379 | 10/1993 | DeLoach . |
| 5,259,962 | 11/1993 | Later . |
| 5,456,881 | 10/1995 | Bandel et al. . |
| 5,460,705 | 10/1995 | Murphy et al. . |
| 5,501,801 | 3/1996 | Zhang et al. ............... 210/748 |

Primary Examiner—Neil McCarthy
Attorney, Agent, or Firm—Patterson & Streets, L.L.P.

[57] ABSTRACT

A method and apparatus for mineralizing organic contaminants in water or air provides photochemical oxidation in a unique two-phase or three-phase boundary system formed in each pore of a $TiO_2$ membrane in a photocatalytic reactor. In the three-phase system, gaseous oxidant, liquid contaminant, and solid semiconductor photocatalyst meet and engage in an efficient oxidation reaction. The porous membrane has pores which have a region wherein the meniscus of the liquid varies from the molecular diameter of water to that of a capillary tube resulting in a diffusion layer that is several orders of magnitude smaller than the closest known reactors. The photocatalytic reactor operates effectively at ambient temperature and low pressures.

44 Claims, 6 Drawing Sheets

5,779,912

PHOTOCATALYTIC OXIDATION OF ORGANICS USING A POROUS TITANIUM DIOXIDE MEMBRANE AND AN EFFICIENT OXIDANT

This invention was made with government support under contract DAAH04-95-C-0019 awarded by the Army. The government has certain rights in this invention.

BACKGROUND OF THE INVENTION

1. Field of the Invention

This invention relates to decontamination of water or air, more specifically to a photocatalytic reactor and method for oxidizing organic pollutants in contaminated water or air.

2. Background of the Related Art

Several technologies have been used in the past to remove or annihilate organic contaminants found in hazardous chemical waters, wastewaters, and polluted gases. Some destructive techniques, e.g., chlorination, use strong oxidants that are themselves hazardous. On the other hand, the predominant non-destructive technologies currently in use have serious drawbacks: air stripping converts a liquid contamination problem into an air pollution problem, and carbon adsorption produces a hazardous solid which must be disposed. Thus, conventional methods for organic contaminant disposal must be replaced with procedures having minimal environmental impact.

Advanced oxidation processes (AOPs) typically involve treatment with ultraviolet light (UV), chemical oxidation, or both. AOPs are destructive processes in which the target organic compounds may be fully oxidized (i.e., mineralized) to relatively innocuous end products such as carbon dioxide, water, and inorganic salts. Because AOPs do not leave any residual contaminants requiring additional treatment, these processes are well suited for destruction of organic pollutants. Therefore, it is important that effective AOP processes be developed.

Typical AOPs rely on the generation of hydroxyl radicals (OH·). The rapid, non-selective reactivity of OH· radicals (one of the most reactive free radicals and strongest oxidants) allows them to act as initiators of the oxidative degradation of organic contaminants. Common AOPs such as $H_2O_2/UV$, $O_3/UV$, and $H_2O_2/O_3/UV$ use UV photolysis of $O_3$, $H_2O_2$, or both to generate OH· radicals. In the photocatalytic oxidation, $TiO_2/UV$, the titanium dioxide semiconductor absorbs UV light and generates OH· radicals mainly from adsorbed water or OH$^-$ ions.

Although most AOPs involve generation of OH· radicals in relatively high steady-state concentrations, they destroy the organic contaminant with different efficiencies. The efficiency of each AOP depends on the structure of the contaminant (which determines the mechanism of destruction and formation of intermediates), pH, design of the reactor, and presence of OH· scavengers (e.g., $HCO_3^-$). The main disadvantages of AOPs are the large retention times required by some compounds, the formation of by-products, and the presence of OH· scavengers.

Most of the photocatalytic studies on the degradation of organic pollutants have used $TiO_2$ as the semiconductor. With $TiO_2$, the overall oxidation reaction is mainly limited by $O_2$ reduction at cathodic sites on the semiconductor surface. Other factors affecting the efficiency of the process are the semiconductor surface area, catalytic properties of the semiconductor, and electron/hole recombination.

A main disadvantage of conventional AOPs, such as $O_3/UV$ and $H_2O_2/UV$, or their combination, is that they cannot utilize abundant solar light as the source of UV light because the required UV energy for the photolysis of the oxidizer is not available in the solar spectrum. Furthermore, some AOPs are efficient in mineralizing organic pollutants but exhibit slow kinetics, e.g., $TiO_2/UV$ and $H_2O_2/UV$, while others exhibit much faster kinetics, but lower degree of mineralization, e.g., $O_3/UV$. Similarly, a limitation on the use of $O_3$ in water treatments is the generation and mass transfer of sufficient $O_3$ through the water to efficiently oxidize the organic contaminant.

Therefore, there is a need for an improved AOP that provides efficient oxidation of organics in process water, contaminated ground water, or polluted air. There is also a need for an AOP that utilizes UV light in the solar spectrum. It would be desirable if the process was cost effective, easy to operate, relatively fast, and capable of achieving total mineralization.

SUMMARY OF THE INVENTION

The present invention combines a porous semiconductor material on a porous substrate with UV illumination (either from solar light or a UV lamp) and an efficient oxidant, such as electrochemically generated ozone ($O_3$), hydrogen peroxide ($H_2O_2$) or oxygen ($O_2$), in a method and apparatus for oxidizing organics in water or in air. The invention includes a process and apparatus wherein efficient photocatalytic oxidation occurs in either a two-phase or three-phase boundary system formed in each pore of a $TiO_2$ membrane disposed in a photocatalytic reactor.

In a first two-phase system, a contaminated gas stream (such as air) is passed over a solid, porous semiconductor photocatalyst and a gaseous oxidant (such as ozone, oxygen or a combination thereof) is passed through the porous photocatalyst. In a second two-phase system, a contaminated water stream is passed over a solid, porous semiconductor photocatalyst and a liquid oxidant (such as aqueous hydrogen peroxide) is passed through the porous photocatalyst. In either two-phase system, the oxidant and contaminant sources are delivered over opposing sides of the porous photocatalyst and contact each other adjacent the solid UV illuminated photocatalyst surface to provide oxidation of the organic contaminants. The process and apparatus allow the use of sunlight or artificial light, such as inexpensive low power UV lamps, as the source of UV illumination directed onto the semiconductor photocatalyst surface.

In a first three-phase system, a gaseous oxidant (such as ozone, oxygen or a combination thereof), a liquid containing organic components, and a porous, solid semiconductor photocatalyst converge and engage in an efficient oxidation reaction. Similarly in a second three-phase system, a gas containing organic components, a liquid oxidant, and a porous solid semiconductor photocatalyst converge and engage in an efficient oxidation reaction. In either three-phase system, the pores of the solid semiconductor photocatalyst have a region wherein the meniscus of the liquid phase varies from the molecular diameter of water to that of a capillary tube resulting in a diffusion layer that is several orders of magnitude smaller than diffusion layers in the closest known reactors. The process and apparatus allow the use of sunlight or artificial light, such as inexpensive low power UV lamps, as the source of UV illumination directed onto the semiconductor photocatalyst surface. Furthermore, generation of OH· radicals can be enhanced by photolysis of the oxidizer ($O_3$ or $H_2O_2$) by using UV lamps with a broader UV spectrum, as used in conventional AOPs.

With the small diffusion layer, the oxidant within the three-phase system simultaneously functions as (i) an electron acceptor at the surface of the $TiO_2$ membrane in the photocatalytic oxidation of organic contaminants, and (ii) an oxidant to be photolyzed in the $O_3$/UV (or $H_2O_2$/UV) reaction if proper UV illumination is used (i.e., wavelengths below 300 nm, preferably between about 220 and 280 nm). The photocatalytic reactor efficiently mineralizes a variety of organic contaminants at ambient temperature and low pressures.

BRIEF DESCRIPTION OF THE DRAWINGS

So that the above recited features and advantages of the present invention can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Figure 1:
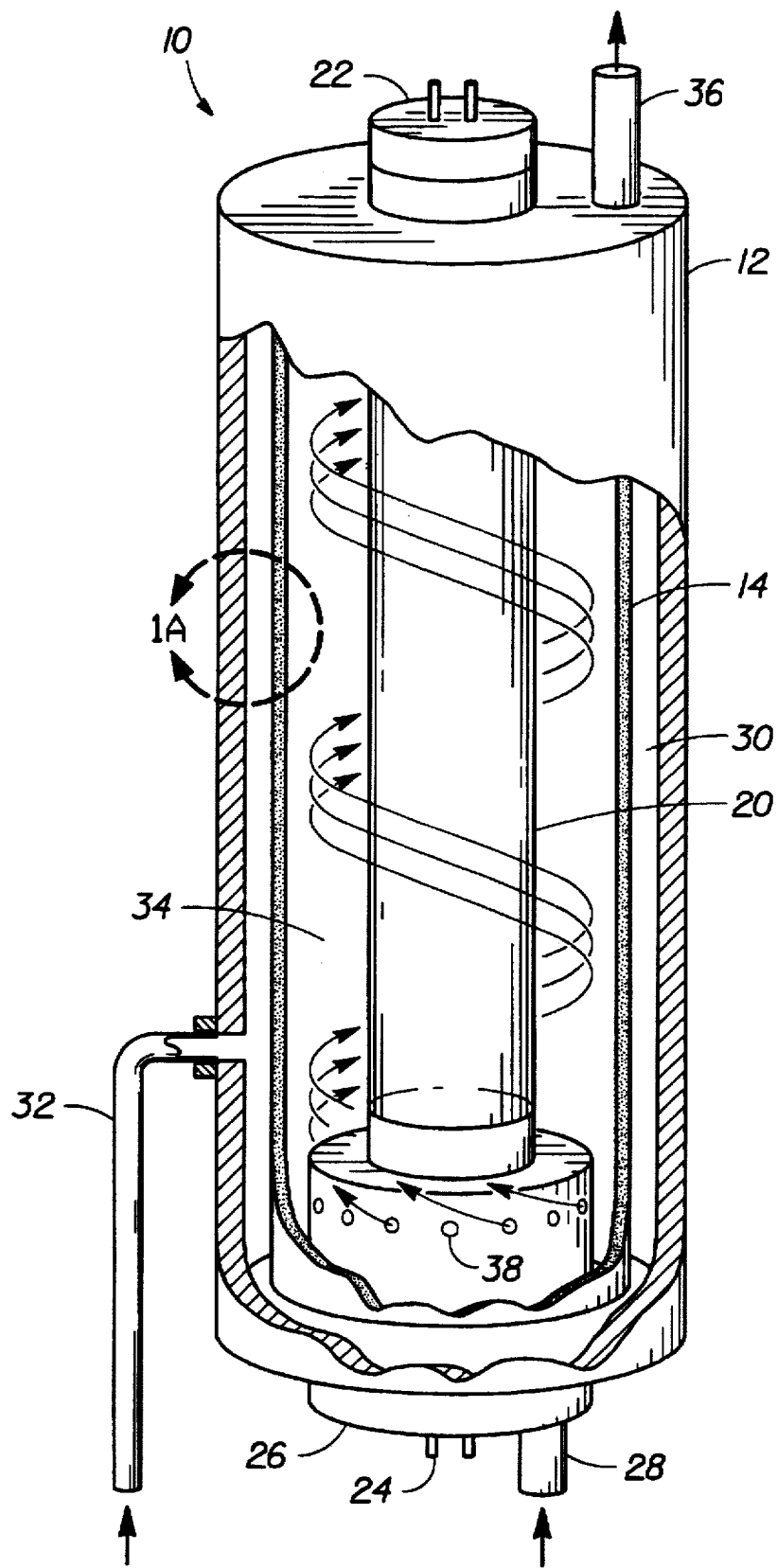
FIG. 1 is a schematic diagram of a photocatalytic reactor which combines UV light, oxidant, and a $TiO_2$ semiconductor membrane in a three-phase reaction zone to efficiently mineralize organics in water, such as process water, contaminated groundwater or potable water.

The present invention provides a process and apparatus wherein efficient photocatalytic oxidation of organic compounds occurs in a unique two-phase or three-phase reaction zone formed in the pores of a substrate having a porous photocatalytic surface. The photocatalytic surface is preferably $TiO_2$ or a binary oxide selected from the group consisting of $TiO_2/SiO_2$, $TiO_2/ZrO_2$, $TiO_2/SnO_2$, $TiO_2/WO_3$, and $TiO_2/MoO_3$.

The apparatus of the invention oxidizes organic contaminants by combining a porous semiconductor photocatalyst surface, an oxidant source and a UV source directed onto the photocatalyst surface. The fluid (liquid or gas) containing organic contaminants is delivered over a first side of the porous substrate having a photocatalytic surface and the oxidant (liquid or gas) is delivered through a second side of the porous substrate to the porous photocatalyst surface.

The porous photocatalyst surface is preferably a porous titanium dioxide layer or surface formed on a porous substrate. The substrate may be made from virtually any material that is sufficiently porous to pass an oxidant therethrough and can provide physical support for the photocatalyst material. For example, the substrate could be made from a porous polymer, a porous metal, porous carbon or graphite, a sintered porous glass or a porous ceramic. The photocatalyst may be applied to the porous substrate by any means including: (1) applying a solution or slurry with a brush followed by sintering; (2) forming a sol-gel, applying the sol-gel by spraying, dipping, or spin coating, then drying and curing; (3) vacuum deposition processes, such as chemical vapor deposition and physical vapor deposition; or (4) electrochemical oxidation of a porous metal in an acid solution. The term "porous" as used in reference to the photocatalyst surface is intended to include any photocatalyst surface having passages therethrough for the oxidant. Therefore, the photocatalyst layer itself may be porous or, conversely, the photocatalyst may be a dense layer that simply leaves the pores of the substrate open. Theoretically, if the photocatalyst had sufficient strength and appropriate pore size, the porous substrate would not be necessary.

The fluid is delivered over the photocatalyst surface through a fluid cell adjacent the porous photocatalyst surface, wherein the fluid compartment or cell comprises a fluid inlet, a fluid outlet and a UV transmission surface positioned to expose the porous photocatalyst surface. The oxidant is delivered to the second side of the porous substrate through an oxidant compartment or cell adjacent the porous substrate, wherein the oxidant cell comprises an oxidant inlet. In order to operate the apparatus, an oxidant source is connected to the oxidant inlet, and an organic contaminant source (such as water or air containing organic compounds) is connected to the fluid inlet. During operation, a UV source provides TV light through the UV transmission surface and onto the porous photocatalyst surface.

In one aspect of the invention, methods are provided for oxidizing organics in two-phase systems. A first two-phase system is provided in which a contaminated gas stream (such as air) is passed over a solid, porous semiconductor photocatalyst and a gaseous oxidant (such as ozone, oxygen or a combination thereof) is passed through the porous photocatalyst. In a second two-phase system, a contaminated water stream is passed over a solid, porous semiconductor photocatalyst and a liquid oxidant (such as aqueous hydrogen peroxide) is passed through the porous photocatalyst. In either two-phase system, the oxidant and contaminant sources are delivered over opposing sides of the porous photocatalyst and contact each other adjacent the solid UV illuminated photocatalyst surface to provide oxidation of the organic contaminants.

In another aspect of the invention, methods are provided for oxidizing organics in three-phase systems. In a first three-phase system, a gaseous oxidant (such as ozone, oxygen or a combination thereof), a liquid containing organic components, and a porous, solid semiconductor photocatalyst converge and engage in an efficient oxidation reaction. Similarly in a second three-phase system, a gas containing organic components, a liquid oxidant, and a porous solid semiconductor photocatalyst converge and engage in an efficient oxidation reaction. In either three-phase system, the pores of the solid semiconductor photocatalyst have a region wherein the meniscus of the liquid phase varies from the molecular diameter of water to that of a capillary tube resulting in a diffusion layer that is several orders of magnitude smaller than diffusion layers in the closest known reactors. The oxidant source preferably provides ozone. The preferred source of ozone is an electrolytic cell which generates an oxidant stream comprising from about 10% to about 18% by weight of ozone. Such electrolytic cells, including depolarizing electrolytic cells, are described in U.S. Pat. No. 5,460,705 which description is incorporated by reference herein. A fully self-controlled electrolytic cell is most preferred for use at remote locations such as a groundwater treatment facility.

The UV source is preferably sunlight which enables a low cost apparatus that mineralizes low concentrations of organics in water, such as process water or groundwater, or in air. The UV source can also be an inexpensive low power UW lamp and the UV transmission surface of the fluid cell can be a UV transmission surface of the UV lamp. I adition, the U source can also be a UV lamp with a broader UV spectrum, as used in conventional AOPs, and the UV transmission surface of the fluid cell can be a UV transmission suface of the UV lamp. It is also possible to transmit or deliver the UV light to the photocatalyst through various means or conduits, such as a fiber optic cable.

In a preferred embodiment, the invention provides an apparatus for oxidizing organic contaminants, comprising a porous substrate having a porous photocatalyst surface; a fluid cell adjacent the porous photocatalyst surface, the fluid cell comprising a UV transmission surface positioned to expose the porous photocatalyst surface, a fluid inlet and a fluid outlet; and an oxidant cell adjacent the porous substrate, the oxidant cell comprising an oxidant inlet.

FIG. 1 is a schematic diagram of a photocatalytic reactor 10 which utilizes UV light, oxidant, and a $TiO_2$ semiconductor membrane in a three-phase reaction zone to efficiently mineralize organics in water, such as process water, contaminated groundwater or potable water. This reactor uses an inexpensive low power UV lamp 20 to supply UV light to mineralize the organic contaminants. The photocatalytic reactor 10 also includes an impermeable outer cylinder 12 of any suitable material and a permeable inner cylinder 14 which comprises a porous substrate material 16 that is coated on the inside with a porous photocatalyst surface 18. The porous substrate material 16 and the porous photocatalyst surface 18 may be produced by a method described in U.S. Pat. No. 5,137,607, column 3, line 58, to column 4, line 55, which description is incorporated by reference herein. A UV lamp 20 is mounted at a first end 22 through the outer cylinder 12 and at a second end 24 through a fluid jet 26 which is mounted through the outer cylinder 12 and has a fluid inlet 28.

The inner cylinder 14 is mounted within the outer cylinder 12 to form an annular oxidant cell 30 having an oxidant inlet 32. The oxidant cell 30 does not have a similar oxidant outlet since oxidants introduced into the oxidant cell 30 pass through the porous material 16 which is adjacent the oxidant cell 30. The oxidants further pass through the porous photocatalyst surface 18 which is adjacent a fluid cell 34. The fluid cell comprises the fluid inlet 28, the fluid jet 26 which directs the fluid toward the porous photocatalyst surface 18, and a fluid outlet 36. The fluid jet 26 preferably has a plurality of centrifugal jets 38 drilled obliquely through the fluid jet 26 for directing the fluid toward the porous photocatalyst surface 18.

Figure 2:
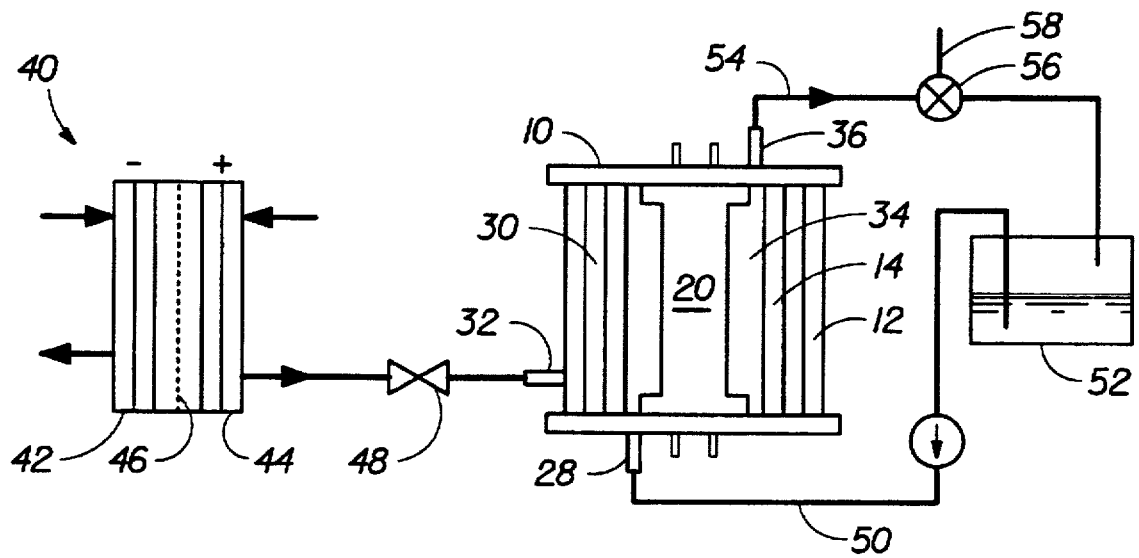
FIG. 2 is a schematic diagram of the photocatalytic reactor of FIG. 1 connected to a depolarized oxidant source and a water reservoir.

FIG. 2 is a schematic diagram of the photocatalytic reactor of FIG. 1 connected to a depolarized oxidant source and a water reservoir. The oxidant inlet 32 is connected to an ozone source 40 which is preferably a depolarizing electrolytic cell having a cathode 42, an anode 44, and optionally a proton exchange membrane 46 to convert water to an oxygen stream having from about 10% to about 18% by weight of ozone. The depolarizing electrolytic cell is described in U.S. Pat. No. 5,460,705 which description is incorporated by reference herein. A gas pressure regulator 48 controls the delivery of ozone gas to the photocatalytic reactor 10.

The fluid inlet 28 is connected by pipes or tubing 50 to a reservoir containing the organic contaminant such as a storage tank 52. For a small fluid cell 34, the fluid outlet 36 may return the fluid to the storage tank 52 for recycling using pipes or tubing 54. A valve 56 diverts the fluid to a discharge pipe or tube 58 for analysis of the remaining amount of the organic contaminant. The performance of the photocatalytic reactor 10 may be checked by liquid chromatography or gas chromatography. In order to mineralize a given amount of the organic contaminant in a single pass through the photocatalytic reactor 10, the size of the reactor can be increased or a plurality of small reactors can be connected in series or in parallel.

Figure 1A:
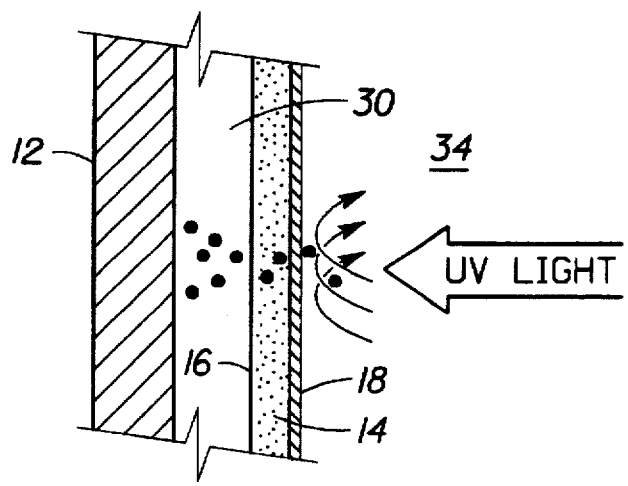
FIG. 1A is a schematic diagram of a section of the reactor of FIG. 1 showing details of the reaction zone.

FIG. 1A is a schematic diagram of a section of the photocatalytic reactor 10 of FIG. 1 showing details of the reaction zone. The reactor 10 is constructed with a porous $TiO_2$ surface 18 on a porous substrate 16. An oxidant, such as ozone gas, feeds through the porous substrate and finally through the porous $TiO_2$ surface 18 where oxidation of organic contaminants occurs in a three-phase reaction zone shown in FIG. 3.

Figure 3:
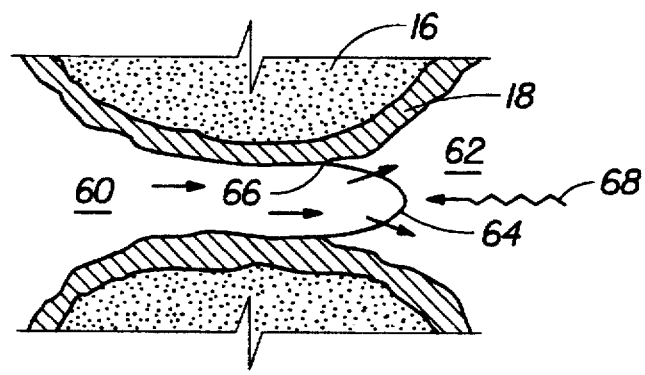
FIG. 3 is a schematic diagram of a pore in the semiconductor membrane of the reactor of FIG. 1.

FIG. 3 is a schematic diagram of a single pore in the semiconductor membrane of the reactor of FIG. 1 being used in a three-phase system. At some distance within the pores of the porous $TiO_2$ surface 18, a gas region 60 diffuses into a fluid region 62 with a boundary layer 64 that contacts the $TiO_2$ surface 18 at a three-phase interface 66. UV light 68 joins the oxidant and organic contaminants at the interface 66 and accelerates photocatalytic oxidation. Where the oxidant is ozone, excess ozone may diffuse into the fluid and can be photolyzed by the UV light if a UV lamp with a broad UV spectrum (including wave lengths lower than 300 nm, preferably from 220 to 280 nm) is used, thus generating additional OH* radicals for non-catalyzed oxidation of organic contaminants.

Figure 4:
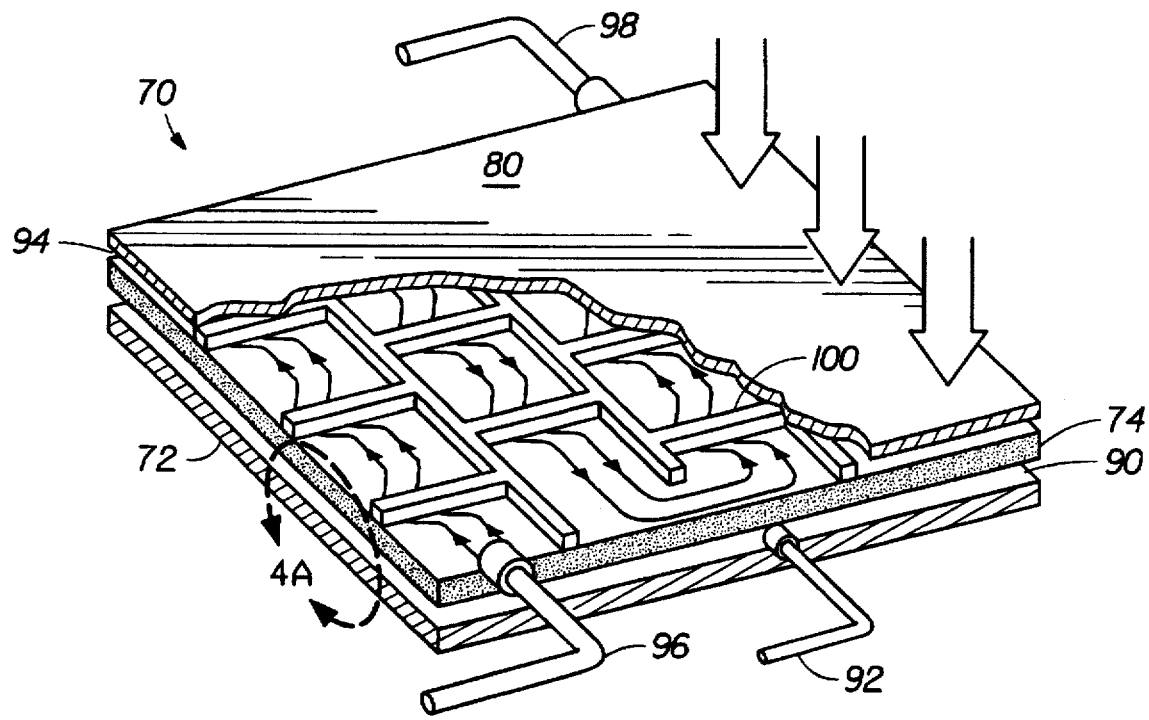
FIG. 4 is a schematic diagram of a photocatalytic reactor panel which combines solar UV light, oxidant, and a $TiO_2$ semiconductor membrane in a three-phase reaction zone to efficiently mineralize organics in water, such as process water, contaminated groundwater or potable water.

FIG. 4 is a schematic diagram of a photocatalytic reactor panel 70 which combines solar UV light, oxidant, and a $TiO_2$ semiconductor membrane in either a two-phase or three-phase reaction zone to efficiently mineralize organics in water, such as process water, contaminated groundwater or potable water, or in air. The photocatalytic reactor panels (shown with sidewalls removed) have the form of solar panels to obtain UV light from the sun. An array of the panels can be positioned in series or parallel as desired to destroy organic contaminants. The photocatalytic reactor panel 70 has an impermeable bottom 72 of any suitable material and a permeable center 74 which comprises a porous substrate material 76 that is coated on the top with a porous photocatalyst surface 78. The porous substrate material 76 and the porous photocatalyst surface 78 may be produced by a method described in U.S. Pat. No. 5,137,607, column 3, line 58, to column 4, line 55, which description is incorporated by reference herein. A UV transmission surface 80 covers the reactor and is positioned to expose the porous photocatalyst surface 78 to sunlight.

Figure 4A:
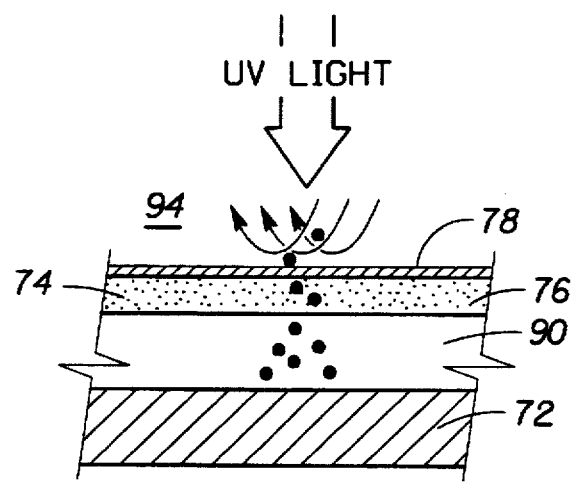
FIG. 4A is a schematic diagram of a section of the reactor of FIG. 4 showing details of the reaction zone.

FIG. 4A is a schematic diagram of a partial cross-section of the reactor of FIG. 4 showing details of the reaction zone.

The porous substrate material 76 is adjacent an oxidant cell 90 having an oxidant inlet 92. The oxidant cell 90 does not have a similar oxidant outlet since oxidants introduced into the oxidant cell 90 pass through the porous substrate material 76 which forms a wall of the oxidant cell 90. The oxidant further passes through the porous photocatalyst surface 78 which is adjacent a fluid cell 94. The fluid cell 94 has a fluid inlet 96 and a fluid outlet 98. The fluid cell 94 has a baffle 100 which directs a fluid through the panel from the fluid inlet 96 to the fluid outlet 98 and toward the porous catalyst surface 78.

Figure 5:
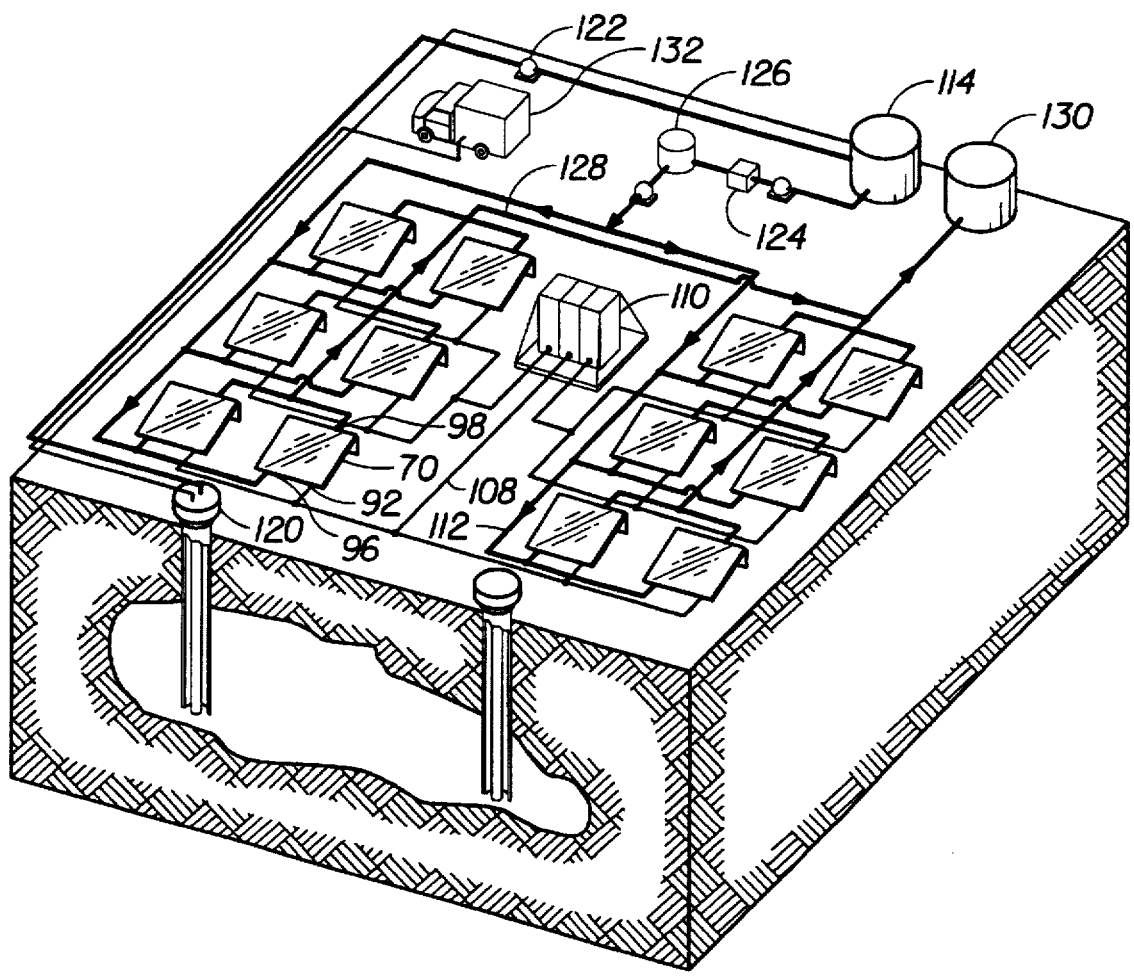
FIG. 5 is a schematic diagram of an array of the photocatalytic reactor panels of FIG. 4 connected in parallel to a portable oxidant source and a groundwater treatment system.

FIG. 5 is a schematic diagram of an array of the photocatalytic reactor panels 70 of FIG. 4 connected in parallel to a portable oxidant source 110 and a groundwater treatment system. The oxidant inlets 92 on an array of reactor panels 70 are preferably connected in parallel by oxidant lines 108 to an oxidant source 110. The oxidant source is preferably an array of electrolytic cells which convert water to an oxygen stream having from about 10% to about 18% by weight of ozone.

The fluid inlets 96 on the array of reactor panels 70 are connected in parallel by pipes 112 to a source of organic contaminant such as a storage tank 114. The organic contaminant can be contaminated groundwater collected from one or more extraction wells 120 by a pump 122. A filter system 124 and a pH adjustment tank 126 will typically be required for treatment of the groundwater prior to oxidation of the contaminant. The fluid outlets 98 on the array of reactor panels 70 are connected in parallel by pipes 128 to a storage tank 130 which holds treated water for re-injection or further treatment. The reactor panels 70 can be located at a remote site using mobile electronic equipment and power supplies 132.

Figure 6:
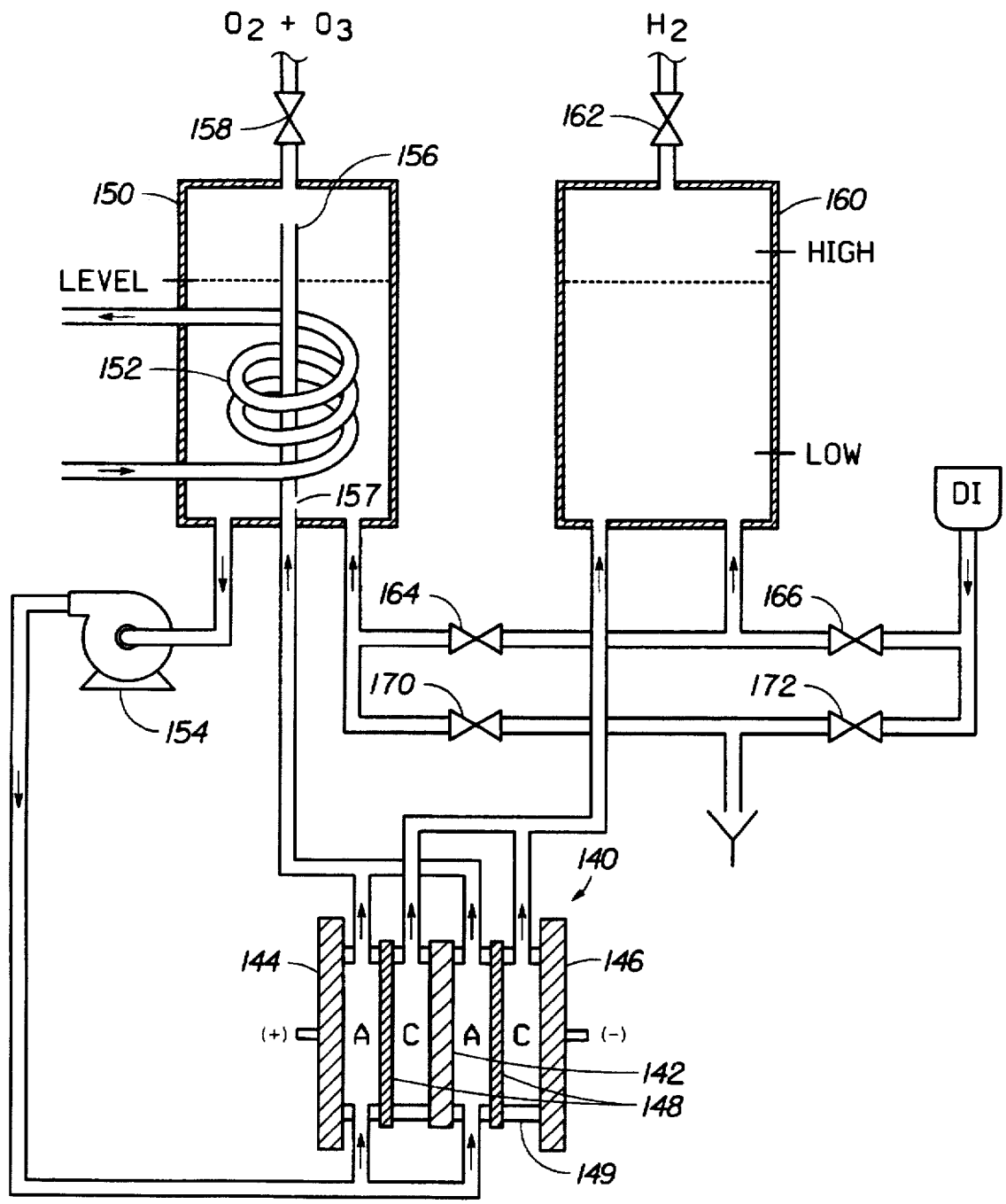
FIG. 6 is a schematic diagram of an ozone source having electrolytic cells for producing ozone under pressure.

FIG. 6 is a schematic diagram of a self controlled ozone source 110 having electrolytic cells for producing ozone under pressure. The electrolytic cells are illustrated having an array of electrolytic cells (two shown) 140, separated by a bipolar plate 142, that are sandwiched between a positive end plate 144 and a negative end plate 146. Each of the individual cells have an anode and anode flowfield A as well as a cathode and cathode flowfield C separated by a proton exchange membrane 148 as described in U.S. Pat. No. 5,460,705, which description is incorporated by reference herein. The anode is preferably made from sintered porous titanium coated with lead dioxide and the cathode is preferably pressed carbon fibers or porous carbon having platinum electroplated on both sides to act as an electrocatalyst for hydrogen evolution. Note that fluid flow is shown as passing through non-conductive cell walls 149 for simplicity, although fluids preferably pass through openings in the end plates 144, 146, bipolar plates 142, and proton exchange membranes 148 as described in the '705 patent.

An anode reservoir 150 holds deionized water which is cooled by coils 152 and recirculated by a pump 154 through the anode cells A. The anode reservoir 150 serves as a liquid/gas separator wherein oxygen and ozone generated in the anode cells A diffuse from the deionized water in a stand pipe 156 and collect at the top of the reservoir 150. A small hole 157 near the bottom of the stand pipe 156 allows the water level to drop in the stand pipe 156 when the anode pump is off and the ozone generator is in a low flow idle mode so that water will continue to circulate from the anodes and the anode reservoir due to thermal convection. The small hole 157 does not interfere with flow of the water and gases up the stand pipe 156 during normal operation. An ozone pressure control valve 158 controls the flow of gases from the top of the reservoir 150 in co-operation with information from various system monitors including a liquid level indicator.

A cathode reservoir 160 holds deionized water and the cathode recovery water which rises from the cathode cells C. The cathode reservoir also serves as a liquid-gas separator wherein hydrogen generated in the cathode cells C collects at the top of the reservoir 160. A hydrogen control valve 162 controls the flow of hydrogen gases from the top of the reservoir 160 in co-operation with various system monitors including high/low liquid level indicators.

The anode reservoir 150 and the cathode reservoir 160 are connected to a source of deionized water (DI) with tubing that includes a first shut-off valve 166 and a second shut-off valve 164. A drain loop having a third shut-off valve 170 and a fourth shut-off valve 172 bypasses the first and second shut-off valves 166, 164 for flushing or draining the system.

Figure 7:
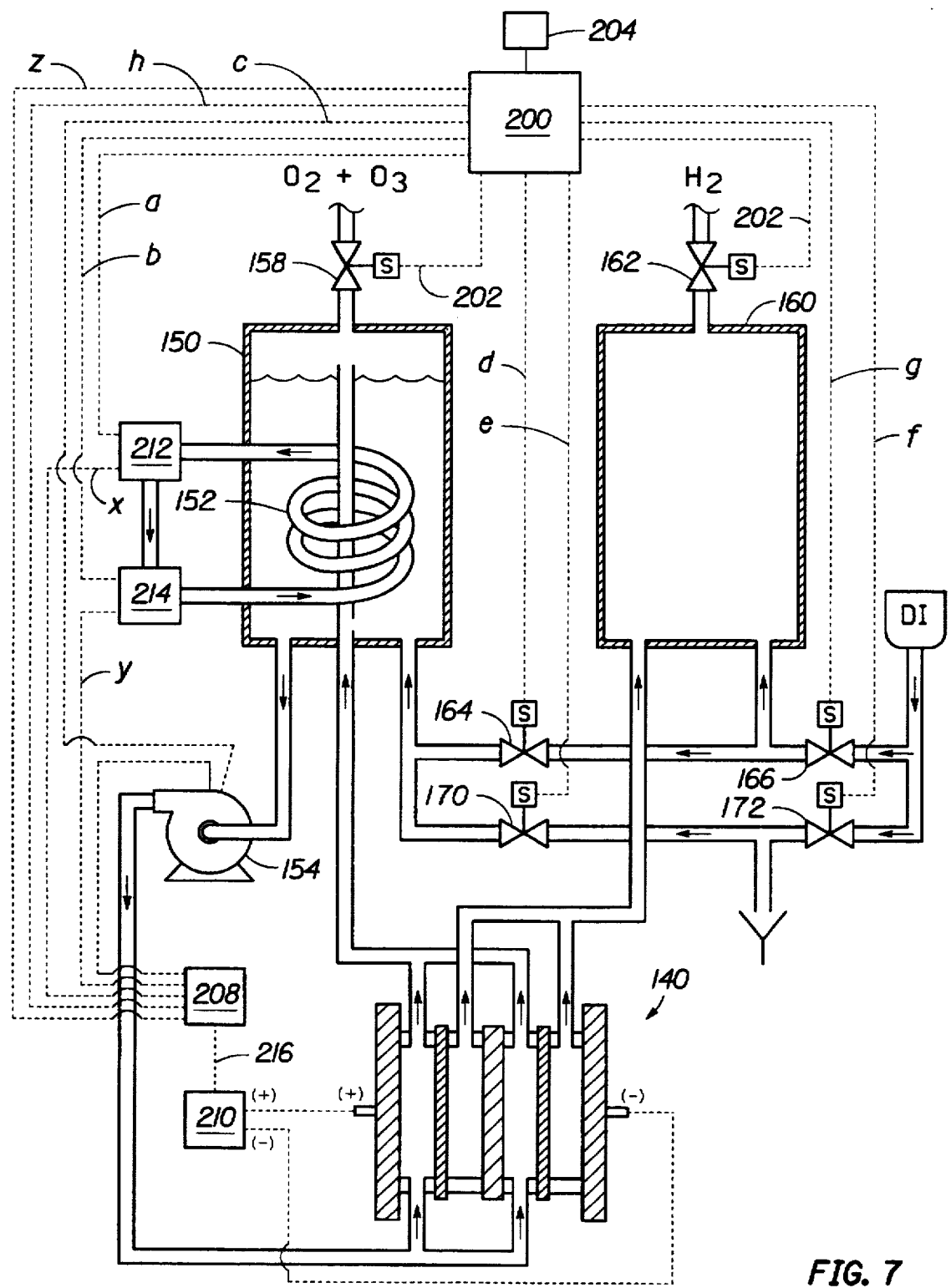
FIG. 7 is a schematic diagram of the ozone source of FIG. 6 included in a self-controlled apparatus which operates with sources of electricity and distilled water.

FIG. 7 is a schematic diagram of the ozone source 110 of FIG. 6 included in a self-controlled apparatus which operates with sources of electricity and distilled water. The array of electrolytic cells 140, the anode reservoir 150, and the cathode reservoir 160 are combined in an ozone generator which is self-controlled by a system controller 200 over control lines 202, a-h. The ozone generator 110 includes a pump, a refrigerant compressor and control valves that are controlled by the system controller 200 which executes system control software stored in a memory 204.

The ozone generator 110 further includes a power supply unit 208 and a power converter 210 for converting AC current to DC current for operation of the array of electrolytic cells 140. A condenser 212 and a compressor 214 are also included for operating the cooling coil 152 in the anode reservoir 150. All components include analog assemblies which are controlled by the system controller 200. Furthermore, all electrical components are powered by the power supply unit 208 by power lines 216, x -z.

The process steps discussed below can be implemented using a computer program product that runs on, for example, the system controller 200. The computer program code can be written in any conventional computer readable programming language.

The invention includes a process for oxidizing organic contaminants in a fluid such as water or air, comprising the steps of flowing a fluid containing organic contaminants over a porous photocatalyst surface, flowing oxidant (such as oxygen, ozone or $H_2O_2$) through the porous photocatalyst surface into the flowing fluid, and exposing the photocatalyst surface to UV light. Preferably, the fluid flows through a fluid cell adjacent the porous photocatalyst surface, the fluid cell comprising a UV transmission surface positioned to expose the porous photocatalyst surface, a fluid inlet, and a fluid outlet. The oxidant flows through an oxidant cell adjacent the porous substrate material, the oxidant cell comprising an oxidant inlet.

Semiconductor photocatalysis can be used to mineralize many types of organic compounds, such as aromatics, alkanes, alkenes, alcohols, haloaromatics, haloalkanes, haloalkenes, haloalcohols, acids, polymers, surfactants, herbicides, pesticides, dyes and nitroaromatics. A process for mineralizing cyanuric acid, and chloro-fluorocarbons (but not their hydrogen-containing substitutes) has not previously been known. The susceptibility of such a wide variety of compounds to treatment in accordance with the present invention, makes photocatalytic degradation a particularly attractive process for air purification and wastewater treatment. Under illumination, electrons (e–) and holes (h+) are generated in the space charge region of the semiconductor. Under proper conditions, the photo-excited electrons (in the conduction band (CB) of the semiconductor) and photo-excited holes (in the valence band (VB) of the semiconductor) can be made available for oxidation-reduction reactions. The photo-generated holes in the VB must be sufficiently positive to carry out the oxidation of adsorbed OH⁻ ions or $H_2O$ molecules to produce OH· radicals (the oxidative agents in the degradation of organic pollutants). The photogenerated electron usually reacts with oxygen or any other oxidant.

In most cases, the semiconductor can undergo oxidative decomposition by the photogenerated holes. It is generally found that only n-type semiconducting oxides are photo-stable towards photo-anodic corrosion, although such oxides usually have band gaps which absorb only UV light. Thus, it is preferred that the semiconductors to be used in accordance with the present invention be: (i) photo-active; (ii) able to use visible light and/or near UV light; (iii) biologically and chemically inert; (iv) photostable; (v) cheap; and (vi) able to produce OH· radicals. $TiO_2$ and $SrTiO_3$ satisfy the energy demand and $TiO_2$ is the most efficient photocatalyst. In addition, $TiO_2$ is effective not only in aqueous solution but also in non-aqueous solvents and in the gas phase. Also, $TiO_2$ is cheap, insoluble under most conditions, photo-stable, and non-toxic. Thus, $TiO_2$ is the most preferred semiconductor for the photo-mineralization of organic pollutants.

The method and apparatus of the invention enables feeding the oxidant (e.g., $O_3$, $H_2O_2$, $O_2$ or combinations thereof) through a porous substrate directly to the semiconductor/ fluid/ oxidant interface. This technique increases the concentration of oxidant at the reaction sites on the surface of the photocatalyst, increasing the heterogeneous reaction rate by several orders of magnitude. In addition, the energy requirements for the reduction reaction in the photocatalyst system can be decreased by the use of $O_3$ or $H_2O_2$ instead of only $O_2$. Electrochemical ozone generation provides an oxygen/ozone stream that is highly concentrated with $O_3$, typically between about 10 and about 18 wt% ozone, as the reactant for the reduction reaction in the photo-degradation of organic pollutants.

Ozone gas is preferably generated by an electrochemical method which offers both process and cost benefits. Electrochemical methods generate ozone by the electrolysis of water using a specially designed electrochemical cell. Sources of electrical power and water are the only requirements for producing $O_3$ electrochemically. The need for drying an oxygen gas stream is eliminated and there are no toxic by-products formed. The reactions occur by applying DC power between the anode and cathode which are placed on either side of a proton-exchange membrane (PEM), preferably made from a perfluorinated sulfonic acid (PFSA) polymer which displays a very high resistance to chemical attack. The use of a PEM instead of a liquid electrolyte offers several advantages: (i) fluid management is simplified and the potential for leakage of corrosive liquids is eliminated; and (ii) the PEM/anode interface provides a chemical environment which is well-suited to the electrochemical $O_3$ reaction. Water is fed to the anode side where water oxidation takes place through the thermodynamically favored $O_2$ evolution reaction, and the $O_3$ formation reaction.

Utilization of high overpotentials and certain electrode materials selectively enhance $O_3$ formation at the expense of $O_2$ evolution. The water oxidation reactions yield protons and electrons which are recombined at the cathode. Electrons are conducted to the cathode via the external circuit. The cathodic reaction is the reduction of $O_2$, wherein air typically serves as the $O_2$ source.

Photo-degradation of DCB Using $TiO_2$ Membranes and Different Oxidants

The apparatus and method of the invention was used to study the kinetics of the photo-degradation of 1,4-dichlorobutane (DCB, a surrogate of the mustard gas warfare agent). The photo-degradation was studied using the experimental photocatalytic reactor 10 with a porous $TiO_2$ membrane 18. The annular porous $TiO_2$ membrane had a particle size of about 4–10 nm, 40–70% porosity, high surface area (about 145 m²/g), and 100–1000 nm $TiO_2$ thickness as fabricated by the sol-gel method of U.S. Pat. No. 5,137,607 and deposited on a porous alpha-alumina tube.

Different oxidants ($O_3$, $O_2$, and $H_2O_2$) were compared. Oxidants were introduced through the oxidant cell to the $TiO_2$/liquid interface. An inexpensive low energy UV lamp (330–420 nm, with maximum intensity at 370 nm) was used. The lamp energy was enough to create the electron-hole pair in $TiO_2$ (the photo-excitation of $TiO_2$ requires light with wavelengths shorter than 380 um). The $TiO_2$/UV/$O_3$ system reduced the DCB concentration about ten times faster than $TiO_2$/UV/$O_2$ and about two times faster than $TiO_2$/UV/ $H_2O_2$. In addition, for the same treatment time, the DCB concentration remaining in solution was six times lower with the $O_3$ treatment than with $H_2O_2$. Direct homogeneous degradation of DCB with $O_3$ and $H_2O_2$ also occurred, but at much lower rates (6 to 10 times) than the heterogeneous reaction. Stripping of DCB was not significant with respect to the photo-degradation of DCB in the presence of $O_3$ or $H_2O_2$.

The disappearance of DCB in the presence of $O_2$ showed poor performance, and it seems to be mainly affected by stripping, since the reaction rates in the presence of $O_2$ and $N_2$ under UV illumination and dark conditions are about the same within the experimental error. DCB stripping was not substantially affected by increasing the pumping rate of the solution. On the other hand, a substantial enhancement of the photo-degradation of DCB was obtained by increasing the convection or turbulence of the solution. This indicates that faster degradation of the contaminant can be achieved by using faster convection mechanisms.

Based on these results, the rate of the photo-degradation of organic pollutants was increased by combining porous $TiO_2$/UV and $O_3$ in a new reactor that increases the convection of the solution so that pollutants make better and faster contact with the photocatalytic surface.

Groundwater Treatment

Mineralization of organic contaminants in groundwater will occur in the system shown in FIGS. 4–7 which includes an array of photocatalytic reactor panels 70 having no moving parts and associated components including a self-controlled ozone generator 110. Pretreatment of the groundwater may occur continuously until holding tanks are filled. One or more ozone generators 110 preferably supply sufficient ozone during daylight hours to operate the photochemical reactor panels 70 since storage of ozone is not economical. The ozone generators 110 can be programmed to provide desired ozone production during daylight hours and remain idle during specific time periods and upon command. Operation of the photocatalytic reactor panels 70 and other associated equipment will be readily understood by persons skilled in water treatment.

Examples of contaminants that can be removed from water are acetone, chlorobenzene, cresols, formaldehyde, hydrazines, isopropanol, methyl ethyl ketone, naphthalene, phenol, toluene, trichloroethylene, PCBs, xylenes, halogenated solvents (dichloroethylene, trichloroethylene and tetrachloroethylene), xylene, benzene, cresol, chloroform, trichloroethane, bromodichloromethane, organophosphorus pesticides and herbicides (atrazine, alachlor, and bromacil), coliform bacteria and viruses, color removal, odor removal, COD and BOD reduction, and residues from explosives manufacture (TNT, RDX, HMX, nitroglycerine). The apparatus can also be used for photo-bleaching of colored Kraft lignin, destruction of chemical warfare agents such as mustard gas, and treatment of effluents from metal finishing processes such as cyanide and EDTA.

While the foregoing is directed to the preferred embodiment of the present invention, other and farther embodiments of the invention may be devised without departing from the basic scope thereof, and the scope thereof is determined by the claims which follow.

What is claimed is:

1. A process for oxidizing organic contaminants, comprising the steps of:
   providing a fluid containing the organic contaminants over a photocatalyst disposed on a first surface of a porous substrate having pores therethrough to a second surface;
   providing an oxidant to the second surface and through the pores of the porous substrate into contact with the photocatalyst on the first surface; and exposing the photocatalyst to ultraviolet light.

2. The process of claim 1, wherein the photocatalyst comprises titanium dioxide.

3. The process of claim 1, wherein the photocatalyst comprises a titanium dioxide based binary oxide.

4. The process of claim 3, wherein the titanium dioxide based binary oxide is selected from $TiO_2/SiO_2$, $TiO_2/ZrO_2$, $TiO_2/SnO_2$, $TiO_2/WO_3$, $TiO_2/MoO_3$, and mixtures thereof.

5. The process of claim 1, wherein the oxidant is selected from the group consisting of, oxygen, ozone, hydrogen peroxide and combinations thereof.

6. The process of claim 5, wherein:
   the fluid flows through a fluid cell adjacent the first surface, the fluid cell comprising a UV transmission surface positioned to expose the photocatalyst, a fluid inlet, and a fluid outlet; and
   the oxidant flows through an oxidant cell adjacent the second surface, the oxidant cell comprising an oxidant inlet.

7. The process of claim 6, wherein the ultraviolet light is provided by an ultraviolet source.

8. The process of claim 7, wherein the oxidant comprises between about 10% to about 18% by weight of electrochemically generated ozone.

9. The process of claim 8, wherein the ultraviolet source is solar light and the ultraviolet transmission surface of the fluid cell is a ultraviolet transmission surface of a solar photoreactor.

10. The process of claim 8, wherein the ultraviolet source is an ultraviolet lamp and the ultraviolet transmission surface of the fluid cell is an ultraviolet transmission surface of the ultraviolet lamp.

11. The process of claim 8, wherein the ultraviolet source is an ultraviolet lamp which includes the ultraviolet wavelength range of 220–280 nm and the ultraviolet transmission surface of the fluid cell is a ultraviolet transmission surface of the ultraviolet lamp.

12. The process of claim 1, further comprising, the step of:
   providing a two-phase or three-phase interface between the solid photocatalyst the contaminant and the oxidant; and
   oxidizing organic contaminants at the interface.

13. An apparatus for oxidizing organic contaminants, comprising:
   a porous substrate comprising a first photocatalytic surface, a second surface and pores extending therethrough;
   means for flowing a fluid containing organic contaminants over the first photocatalytic surface;
   means for flowing an oxidant through the pores of the porous substrate into the flowing fluid; and
   means for exposing the photocatalytic surface to ultraviolet light.

14. The apparatus of claim 13, wherein the photocatalytic surface comprises porous titanium dioxide.

15. The apparatus of claim 13, wherein the photocatalytic surface comprises a porous titanium dioxide based binary oxide.

16. The apparatus of claim 15, wherein the titanium dioxide based binary oxide is selected from $TiO_2/SiO_2$, $TiO_2/ZrO_2$, $TiO_2/SnO_2$, $TiO_2/WO_3$, $TiO_2/MoO_3$, and mixtures thereof.

17. The apparatus of claim 13, wherein the oxidant is oxygen, ozone, hydrogen peroxide, or combinations thereof.

18. The apparatus of claim 14, wherein:
   the means for flowing a fluid comprises a fluid cell adjacent the porous first photocatalytic surface, the fluid cell comprising a ultraviolet transmission surface positioned to expose the first photocatalytic surface to ultraviolet light, a fluid inlet, and a fluid outlet; and
   the means for flowing the oxidant comprises an oxidant cell adjacent the second surface, the oxidant cell comprising an oxidant inlet.

19. The apparatus of claim 18, further comprising an oxidant source connected to the oxidant inlet, and an organic contaminant source connected to the fluid inlet.

20. The apparatus of claim 19, further comprising a ultraviolet source which exposes the first photocatalytic surface to ultraviolet light.

21. The apparatus of claim 20, wherein the oxidant source comprises an electrolytic cell which generates an oxygen stream comprising from about 10% to about 18% by weight of ozone.

22. The apparatus of claim 21, wherein the ultraviolet source is solar light and the ultraviolet transmission surface of the fluid cell is a ultraviolet transmission surface of a solar photoreactor.

23. The apparatus of claim 21, wherein the ultraviolet source is an ultraviolet lamp and the ultraviolet transmission surface is part of the ultraviolet lamp.

24. The apparatus of claim 21, wherein the ultraviolet source is an ultraviolet lamp which includes the ultraviolet wavelength range of 220–280 nm and the ultraviolet transmission surface of the fluid cell is a ultraviolet transmission surface of the ultraviolet lamp.

25. An apparatus for oxidizing organic contaminants, comprising:
   a porous substrate having a photocatalyst disposed on one surface and pores extending therethrough;
   a fluid cell adjacent the photocatalyst surface, the fluid cell comprising a fluid inlet, a fluid outlet, and a ultraviolet transmission surface positioned to expose the porous photocatalyst surface; and an oxidant cell adjacent a second, opposed surface of the porous substrate, the oxidant cell comprising an oxidant inlet.

26. The apparatus of claim 25, wherein the photocatalyst surface comprises titanium dioxide.

27. The apparatus of claim 26, wherein the photocatalyst surface comprises a porous titanium dioxide based binary oxide.

28. The apparatus of claim 27, wherein the titanium dioxide based binary oxide is selected from $TiO_2/SiO_2$, $TiO_2/ZrO_2$, $TiO_2/SnO_2$, $TiO_2/WO_3$, $TiO_2/MoO_3$, and mixtures thereof.

29. The process of claim 25, wherein the oxidant is oxygen, ozone, hydrogen peroxide, or combinations thereof.

30. The apparatus of claim 29, further comprising an oxidant source connected to the oxidant inlet, and an organic contaminant source connected to the fluid inlet.

31. The apparatus of claim 30, further comprising an ultraviolet source which exposes the photocatalyst surface to ultraviolet light.

32. The apparatus of claim 31, wherein the oxidant source comprises an electrolytic cell which generates an oxygen stream comprising from about 10% to about 18% by weight of ozone.

33. The apparatus of claim 32, wherein the ultraviolet source is solar light and the ultraviolet transmission surface of the fluid cell is an ultraviolet transmission surface of a solar photoreactor.

34. The apparatus of claim 32, wherein the ultraviolet source is an ultraviolet lamp and the ultraviolet transmission surface of the fluid cell is a ultraviolet transmission surface of the ultraviolet lamp.

35. The apparatus of claim 32, wherein the ultraviolet source is an ultraviolet lamp which includes the ultraviolet wavelength range of 220–280 nm.

36. The apparatus of claim 25, wherein the fluid inlet directs the oganic contaminant toward the porous photocatalyst surface.

37. A process for oxidizing organic contaminants, comprising the steps of:

introducing the organic contaminants over a first surface of a porous photocatalyst;

introducing an oxidant over an opposing surface of the porous photocatalyst; and contacting the organic contaminants with the oxidant adjacent the first surface.

38. The process of claim 37, farther comprising the step of:

exposing the photocatalyst surface to ultraviolet light.

39. A photocatalytic reactor for oxidizing organic contaminants, comprising:

a substrate having first and second opposed faces and pores communicating between the faces, wherein at least the first face is photocatalytic;

a fluid cell communicating with the first face and allowing transmission of ultraviolet light onto the first face; and an oxidant cell communicating with the second face.

40. The photocatalytic reactor of claim 39, wherein the substrate has sufficient porosity for passage of the oxidant.

41. The photocatalytic reactor of claim 39, wherein the substrate has a porosity between about 40 and about 70 percent.

42. The photocatalytic reactor of claim 39, further comprising a flow controller for controlling the amount of oxidant passing through the pores.

43. The process of claim 7, wherein the oxidant comprises hydrogen peroxide.

44. The process of claim 7, wherein the oxidant comprises a source of oxygen.

* * * * *